April 8, 1952     D. A. STARK     2,592,487
METERING FUSE
Filed July 10, 1945     2 SHEETS—SHEET 1
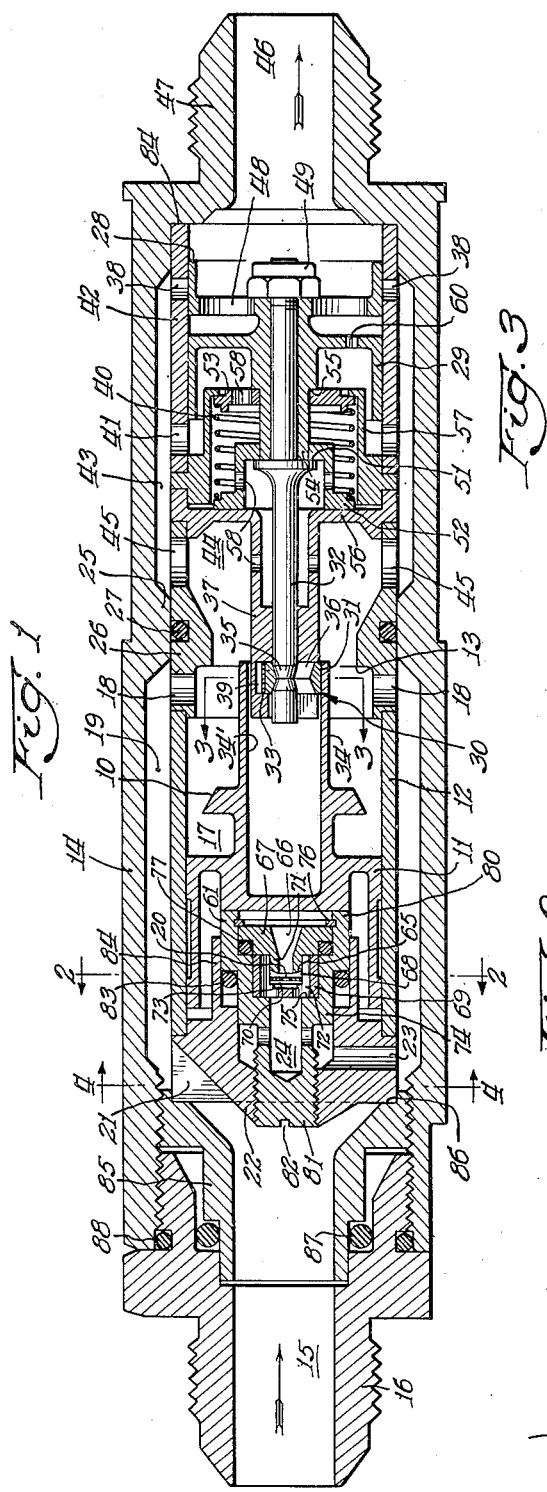
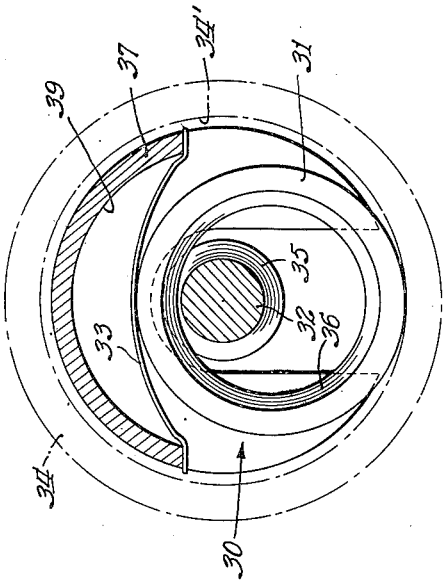
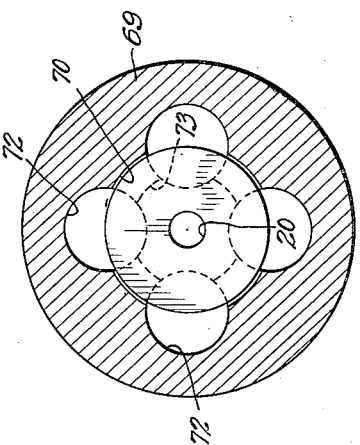
Inventor:
Donald A. Stark
By: Roland C. Kehm
Atty.

April 8, 1952     D. A. STARK     2,592,487
METERING FUSE
Filed July 10, 1945     2 SHEETS—SHEET 2
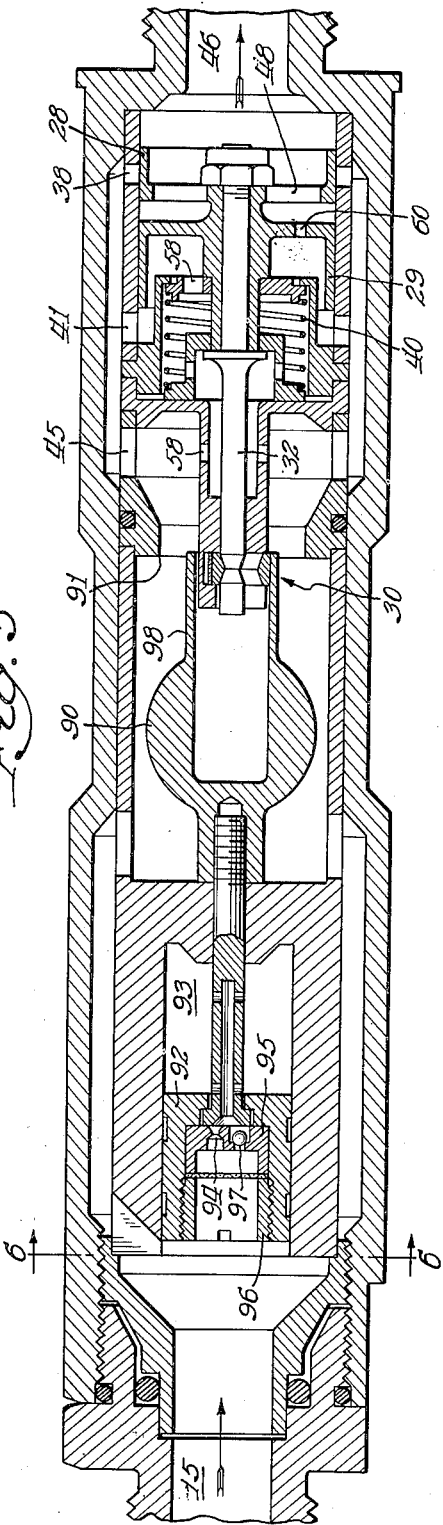
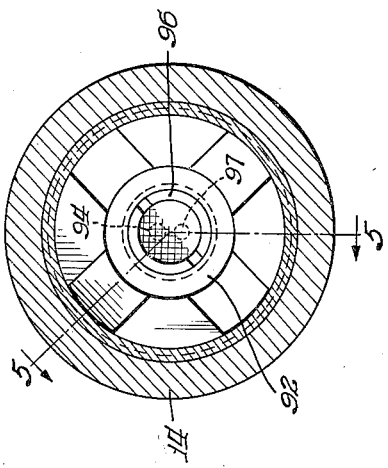
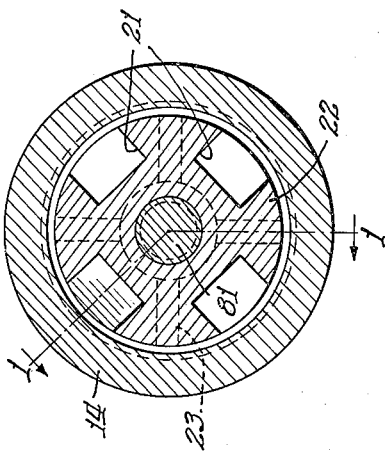
Inventor:
Donald A. Stark Patented Apr. 8, 1952

2,592,487

UNITED STATES PATENT OFFICE 2,592,487

METERING FUSE

Donald A. Stark, Chicago, Ill., assignor to
William Waterman, Chicago, Ill.

Application July 10, 1945, Serial No. 604,216

8 Claims. (Cl. 137—152)

This invention relates to so-called fuses for altering or interrupting fluid flow under certain conditions. Among other objects, the invention aims to provide a metering fuse which is responsive only to flow.

Another object of the invention is to provide a fuse which will not reset itself until return flow.

Other objects and advantages and the nature of the invention will become apparent from the following description of illustrative fuses embodying the invention and illustrated in the accompanying drawings.

In said drawings:

Figure 1 is a longitudinal section of a fuse taken on the broken plane 1—1 of Fig. 4;

Fig. 2 is a cross section taken on the plane 2—2 of Fig. 1;

Fig. 3 is a cross section taken on the plane 3—3 of Fig. 1;

Fig. 4 is a cross section taken on the plane 4—4 of Fig. 1;

Fig. 5 is a longitudinal section of a different type of fuse taken on the broken plane 5—5 of Fig. 6; and Fig. 6 is a section taken on the plane 6—6 of Fig. 5.

Fuses of the character here involved are employed in fluid lines such as hydraulic lines, to interrupt or alter fluid flow under certain conditions, e. g., to cut off flow in the event of rupture of the line. Metering fuses usually interrupt flow after passage of a predetermined volume of flow. In such fuses a valve element is moved by flow toward its seat at a rate proportional to the volume of flow, and reaches its seat when a predetermined volume has passed. Reverse flow returns the valve element to its initial position. Such fuses are advantageously employed in lines leading to cylinders, etc., which employ a definitely limited volume of fluid for their operation. Flow in excess of this volume, involving as it would some abnormality such as line breakage, would cause operation of the fuse. While metering fuses of this character do permit loss of fluid equivalent to such limited volume before closing, this is generally not serious compared to the loss of all fluid which might occur in the absence of such a fuse.

Heretofore such fuses have employed restraining means such as a spring or friction to prevent any closing movement of the fuse valve under gravity, vibration and inertia forces. Premature closing by such extraneous forces would of course preclude use of the fuse. In air craft where inertia forces may be many times gravity, springs or friction to be effective must exert a pressure in excess of the maximum inertia force of the valve element whose movement is to be prevented. The fuse is therefore insensitive to leakage and low rates of flow, whose valve closing force is less than the force of the restraining means. Moreover springs, as an inevitable incident of their use, tend to reset or open the valve when flow ceases. In many systems this incident of operation is objectionable. Often the cycle of operation involves discontinuous or interrupted flow, in which case the fuse is reset between intervals of flow and before the end of the cycle, with the result that even though the aforesaid predetermined volume may have completely or nearly completely passed the fuse, line breakage at such a time will nevertheless involve a loss of the entire predetermined volume of fluid before the fuse operates instead of only such fraction of such volume as may not yet have passed.

This unnecessary loss of fluid is prevented by the present invention by providing a fuse which responds (as regards resetting or return to full open position) only to return flow. Flow during the cycle need not be continuous but may be repeatedly interrupted without resulting in a resetting of the fuse which occurs only on return flow. In the event of line breakage, the fluid loss (before operation of the fuse) is limited practically to that fraction of the predetermined volume which has not passed the fuse.

In the illustrative fuse, the valve element is held against resetting or opening movement except on return flow. This makes it possible to dispense with the spring or other restraining means which, as explained above, incidentally operated to reset the valve element whenever flow ceased. In this instance, the valve element is also held against forward or closing movement except under the force of flow, and, being free of any restraining means, is sensitive to very low rates of flow as presently explained.

The invention is here illustrated as applied to two different types of fuses shown respectively in Waterman application Serial No. 525,275 now Patent 2,512,190, and in Waterman Patent No. 2,354,161; but it will be apparent that the invention is not limited to these types of fuses.

Referring first to the fuse shown in Fig. 1, the valve element 10 is embodied in a piston 11 movable in cylinder 12 toward valve seat 13, in which position flow through the fuse is cut off. As here shown, the flow enters the fuse housing 14 through passage 15 in a standard coupling element 16, and passing around cylinder 12 enters space 17 through control holes 18 in advance of seat 13. Control holes 18 and the annular space 19 are designed to produce a relatively low pressure drop to provide a force against piston 11 for operating valve 10. The rate of movement of the valve toward its seat, and therefore the metering action of the fuse, is controlled by an orifice 20 through which a small or divided fluid flow induced by such pressure drop must pass to operate piston 11 and its valve. The small or divided flow reaches orifice 20 through inclined passages 21 in the head 22 which communicate with radial passages 23 leading to the central space 24. As presently explained in detail, the orifice 20 is adjustable to adapt the fuse for metering different volumes of flow. As explained in said Waterman application (now Patent 2,512,190), the respective orifices and passages may be designed so that the ratio between the flow in the main stream and that through the orifice 20 may be made substantially constant regardless of variations in viscosity thereby making operation of the fuse independent of variations in viscosity.

When valve 10 reaches its seat further flow is cut off since the reduced portion 25 of the fuse housing in which fits the sleeve 26 with its sealing ring 27 closes annular space 19 and obliges all fluid traversing the fuse to pass through control holes 18 which together with seat 13 are formed in sleeve 26.

Return flow through control holes 18 and passage 19 also involves a slight pressure drop which is operative against the piston 11 to reset the valve, i. e., to return it to fully open position and thereby displacing the fluid behind piston 11. On such return, orifice 20 is preferably by-passed, as presently explained, so as not unecessarily to retard return.

During periods of no flow, valve 10 and its piston 11 are held against return movement, and in this instance also against closing movement, by a flow responsive device which is insensitive to extraneous forces such as gravity, inertia, vibration, etc. It responds readily to return flow (and in this case also to forward flow) to release the valve to permit it to move with flow. When the valve is thus released it is free to respond to all rates of flow. The flow responsive device is here shown in the form of a piston 29 and slide valve 28 which are moved by forward and return flow to operate the valve releasing means 30. Such means is represented by a clamping element 31 which normally holds valve 10 and its piston but is releasable by longitudinal movement of rod 32 in either direction. Flow through the fuse cannot occur until valve 28 is opened and valve 10 released, and the latter is released only by flow. Clamping element 31 is in the form of a ring pressed laterally by spring 33 against the surface of extension 34 or valve 10. Rod 32 and ring 31 are provided with double coacting cam surfaces 35 and 36 which operate on longitudinal movement of rod 32 in either direction to withdraw ring 31 against pressure of spring 33 from engagement with extension 34 to release the valve. Rod 32 operates inside sleeve 37 which in turn operates inside the bore 38 in extension 34. Sleeve 37 is provided with a recess 39 open at the side for holding ring 31 and its spring (Fig. 1) When the coacting cam surfaces 35 and 36 register with each other, ring 31 is projected laterally and frictionally engages extension 34 with sufficient force to prevent its movement under the aforesaid extraneous forces of gravity, inertia, etc. The cam surfaces are normally held in register (with the clamp engaged) and slide valve 28 closed over ports 38, by a centering spring 40. The latter resists movement of piston 29 (by forward and return flow) but in relation to the area of piston 29 it is not strong enough to prevent movement (if desired) no matter how low the rate of flow. As presently explained by use of an orifice in piston 29, the latter may be made insensitive to any desired minimum rate of flow. Forward flow reaches piston 29 through ports 41 and cylinder 42. The latter is of smaller diameter than the housing 14 to provide an annular passage 43 which connects with the inner space 44 through ports 45. Forward flow pressure against piston 29 moves it and sleeve 28 (compressing spring 40) to uncover ports 38 so that flow from passage 43 may reach outlet passage 46 which terminates in a standard threaded coupling 47. Openings 48 in the web of valve 28 provide communication between ports 38 and passage 46. Such movement simultaneously releases clamp 30 so that valve 10 may move with the flow; and, if desired, it may respond to any flow no matter how low. This operation contrasts with that of prior fuses wherein the valve restraining means also prevented movement under low rates of flow which exerted a force less than that necessary to overcome the spring.

Return flow operates to move piston 29 and valve 28 in the opposite direction (also compressing spring 40 as presently explained) to uncover port 38 and simultaneously release clamp 30 to permit valve 10 to be moved by such return flow to open or reset position.

Piston 29 and valve 28 are held by a nut 49 against a shoulder 51 on rod 32. Spring 40 is centered between spring seats 52 and 53 both loose on piston hub 54 and resting respectively against shoulder 51 and shoulder 55 on the hub. Movement of seat 52 in the return direction is limited by engagement with flange 56 carried in this instance on sleeve 37. Movement of seat 53 in a forward direction is limited by engagement with the inwardly flanged sleeve 57. The margins of flange 56 and sleeve 57 are mutually rabbeted (see Fig. 1) to center them with each other and with cylinder 42 and sleeve 26 between which they are clamped against longitudinal movement.

Upon forward movement of piston 29, spring 40 is compressed by seat 52 and on reverse movement by seat 53. When there is no flow, flange 56 on sleeve 37 centers the spring which, in turn registers cams 35 and 36 to permit clamping of valve 10 against movement. The clamp is released only by movement of piston 29, which movement occurs only with either forward or return flow. So long as forward flow (however small) persists, the valve is free to move. In the absence of intervening return flow, the valve may move toward its seat by increments without involving intervening resetting of the valve. Seats 52 and 53 in sleeve 37 are provided with openings 58 to equalize pressure on opposite sides of the seats and for other purposes next explained.

If desired, the fuse may be made insensitive to operation by any predetermined minimum rate of flow. For example, if the system involve normal leakage past pistons, etc., such flow as is represented by this leakage may be permitted to pass the fuse without inducing operation. Also, the fuse may be made to operate only when the flow exceeds a predetermined rate. The fuse may be given the aforesaid functions by providing a control port, in this case the port 60 in piston 29, whose size is designed to permit the aforesaid limited flow without involving operation of the fuse. Thus flow may pass valve 10 and piston 29 without inducing operation by passing through port 60, until it exceeds the predetermined rate in which case the piston 29 is operated as above described. In the event the viscosity of the fluid varies considerably it is preferable that the orifice 60 be given a sharp edge to minimize the effect of variation in viscosity.

Control orifice 20 is advantageously designed to embody a check valve which permits free escape of fluid inside piston 11 (when the latter returns) so as not to restrict return of the latter as would be the case if return flow were obliged to pass through orifice 20. The illustrative check valve is shown particularly in Figs. 1 and 2 wherein orifice 20 is in the form of a movable disk which on forward flow rests on the edge 65 of the central passage 66 in the orifice fitting 67. Return flow through passage 66 raises the orifice disk from its seat and escapes through the space 68 underneath the orifice disk. The latter is limited in its movement by a surrounding cylinder 69 having a central bore 70 extending axially only partly through the cylinder and providing a space for the orifice disk and the projecting tip 71 of the orifice fitting. Auxiliary bores 72 passing through cylinder 69 connecting with space 68 permit escape of the fluid to the central space 24 with which the radial passages 23 connect. The central bore 70 is counterbored as at 73 to a diameter smaller than the diameter of the orifice disk to provide a space above the orifice through which return fluid passing through the orifice may escape into the auxiliary bores 72. Such return flow advantageously serves to wash out the orifice and to remove any particles of solid matter therein which might otherwise alter the metering adjustment. The orifice fitting and cylinder 69 are enclosed by a housing 74 having an interior shoulder 75 against which cylinder 69 seats. A spring ring 76 holds the fitting in place and a sealing ring 77 prevents leakage around the orifice and its fitting.

Major changes in the metering capacity of the fuse are advantageously made by varying the size of orifice 20. This is effectively accomplished by employing orifice plates with orifices of varying sizes which may be substituted one for the other. Fine adjustments are made by means of adjusting a stop 80 which varies the displacement of valve piston 11 by lengthening or shortening its stroke. Such stop is here embodied in the cylindrical orifice housing 61 which in this case is provided with a threaded extremity 81 by means of which the cylinder 69 and its stop 80 may be moved longitudinally of cylinder 12. As here shown, the extension 81 is threaded into head 22 and provided with a tool receiving recess such as a screwdriver slot 82 by means of which it may be rotated and longitudinally adjusted by access through the passage 15 and without disassembling the fuse. The friction of sealing ring 83 which lies between the orifice housing 69 and the cylindrical skirt 84 on head 22 prevents accidental rotation of the extension 81 which might alter the aforesaid adjustment. The seal also prevents leakage between the head and the orifice housing 69.

In assembling the fuse, the various parts are successively introduced into the housing 14 which is open at the end carrying the coupling element 16. The first element, being the valve sleeve 42, abuts the shoulder 84 adjacent the opposite end of the housing. The successive elements are then clamped in assembled position by means of the tubular clamping screw 85 which is threaded into the housing 14 in advance of coupling 16 and bears against the shoulder 86 on head 22. The latter engages the extremity of cylinder 12 to transmit clamping pressure to the other stationary elements of the fuse. Thereafter, the coupling element 16 is screwed into the housing and engages the end thereof. Seals 87 and 88 respectively prevent leakage between the screw 85, coupling element 16 and housing 14.

In Figs. 5 and 6 is illustrated the adaptation of the present invention to a fuse of the type shown in Waterman Patent No. 2,354,161. As here shown, the valve 90 which corresponds to the valve 10 of said patent is advanced toward its seat 91 by fluid travelling through the fuse. This movement is controlled, as described in said patent, by a brake piston 92 which requires fluid displaced from the cylinder 93 to pass through control orifice 94 whose size determines the metering adjustment of the fuse. As explained in said patent, the operation of the fuse is made independent of variations in viscosity by appropriate design. The orifice element 95 carrying the orifice may be removed and replaced by withdrawing the clamping screw 96 which holds the orifice element in place. The latter is advantageously provided with a check valve 97 which allows relatively free entrance of fluid into cylinder 93 so as to permit a relatively quick return or resetting of the fuse valve 90 by return flow.

The valve element is provided with a projecting cylinder 97 which corresponds with the projecting sleeve 34 in the fuse illustrated in Fig. 1. The valve locking and releasing means 30 and its associated elements may advantageously be identical with those illustrated in Fig. 1 and for convenience are given identical reference characters, thus making unnecessary repetition of the description of the aforesaid means in connection with the form of fuse illustrated in Fig. 5. It will be understood that these elements correspond in structure and function with those illustrated and described in connection with Fig. 1.

Obviously, the invention is not limited to the details of the illustrative devices, since these may be variously modified. Moreover, it is not indispensable that all features of the invention be used conjointly since various features may be used to advantage in different combinations and subcombinations.

Having described my invention, I claim:

1. In a fuse of the character described, the combination comprising a housing adapted to be incorporated in a fluid line, a valve seat in said housing, a normally open valve in said housing acted on by fluid flow and adapted to be displaced toward said seat by fluid flow, a fluid pressure responsive means for holding said valve against further movement in either direction upon interruption of flow.

2. A fuse of the character described, comprising in combination a housing having a fluid passage and valve seat therein, a normally open valve exposed to fluid flow and movable thereby toward said seat, means for controlling the rate of valve movement to correspond with the rate of flow through said housing, and means for holding said valve in an intermediate position upon interruption of flow.

3. A fuse of the character described, comprising in combination a housing having a fluid passage and valve seat therein, a valve exposed to fluid flow and movable thereby in the direction of flow through said housing toward or away from said seat, a device engaging said valve to hold the latter against movement, and a flow responsive device actuated by the pressure incident to fluid flow in either direction to release said device.

4. A fuse of the character described, comprising in combination a housing having a fluid passage and valve seat therein, a valve exposed to fluid flow and movable thereby in the direction of flow through said housing toward or away from said seat, clamping means normally engaging said valve to hold the same against movement, and a releasing device actuated by fluid pressure incident to fluid flow in either direction to release said clamping means.

5. A fuse of the character described, comprising in combination a housing having a fluid passage and valve seat therein, a valve in said housing exposed to fluid flow and movable thereby in the direction of flow through said housing toward or away from said seat, a cylindrical element projecting from said valve, an expansible and contractible device engaging said cylindrical element to hold the valve against movement, and a piston responsive to fluid pressure incident to fluid flow and having means for operating said device to release said valve.

6. A fuse of the character described, comprising in combination a housing having a fluid passage and valve seat therein, a valve in said housing exposed to fluid flow and movable thereby in the direction of flow through said housing toward or away from said seat, an element projecting from said valve and having a cylindrical bore therein, an expansible and contractible device for operating in said bore so as to be engageable and disengageable therewith to hold the valve against movement and to release the latter, a piston in said housing actuated by the pressure incident to fluid flow in either direction and carrying a rod adapted on movement relative to said expansible and contractible device to contract the latter to release said valve.

7. A fuse of the character described, comprising in combination a housing having a fluid passage and valve seat therein, a valve exposed to fluid flow and movable thereby in the direction of flow through said housing toward or away from said seat, means for engaging said valve to hold the latter against movement, a piston device in said housing and responsive to the pressure incident to flow in either direction to operate said means to release said valve, and devices operative upon interruption of flow to return said piston to neutral position to cause said means to reengage said piston to hold the latter against movement during periods of no flow.

8. A fuse of the character described, comprising in combination a housing having a fluid passage and valve seat therein, a valve in said housing and exposed to the pressure drop incident to flow through said housing and movable thereby toward said seat, a clamping device releasable by the pressure incident to fluid flow in said housing for holding said valve against movement toward or away from its seat, and means operating upon cessation of flow for actuating said clamping means to hold the valve against further movement until resumption of flow.

DONALD A. STARK.

REFERENCES CITED

The following references are of record in the file of this patent:

UNITED STATES PATENTS

| Number | Name | Date |
| --- | --- | --- |
| 1,788,368 | Brown | Jan. 13, 1931 |
| 1,990,741 | Marvel | Feb. 12, 1935 |
| 2,095,560 | Vickers | Oct. 12, 1937 |
| 2,354,161 | Waterman | July 18, 1944 |
| 2,439,116 | Waterman | Apr. 6, 1948 |